July 19, 1955     T. VON KARMAN ET AL     2,713,392
WIND MOTOR
Filed May 11, 1950     2 Sheets-Sheet 1
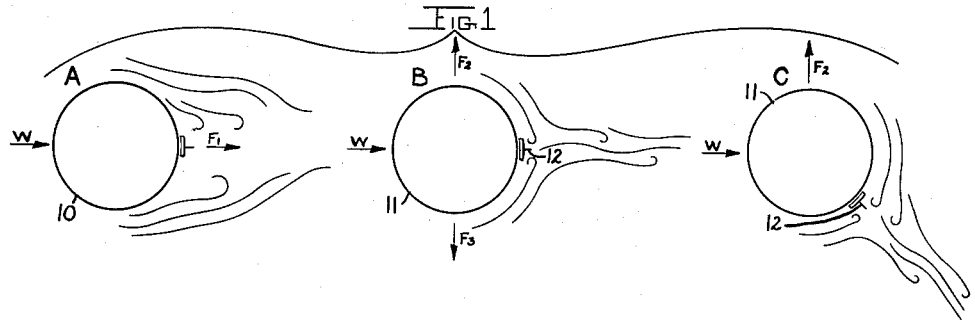
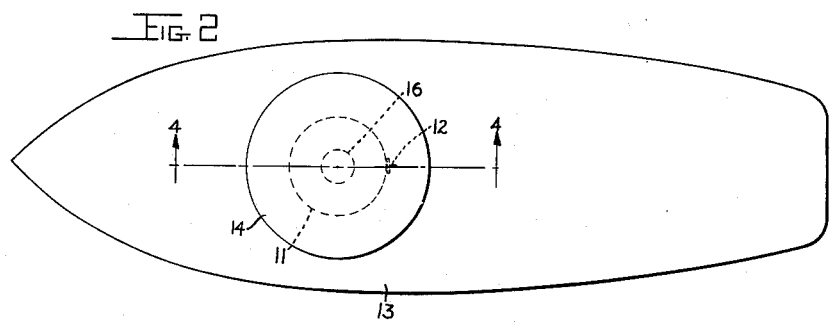
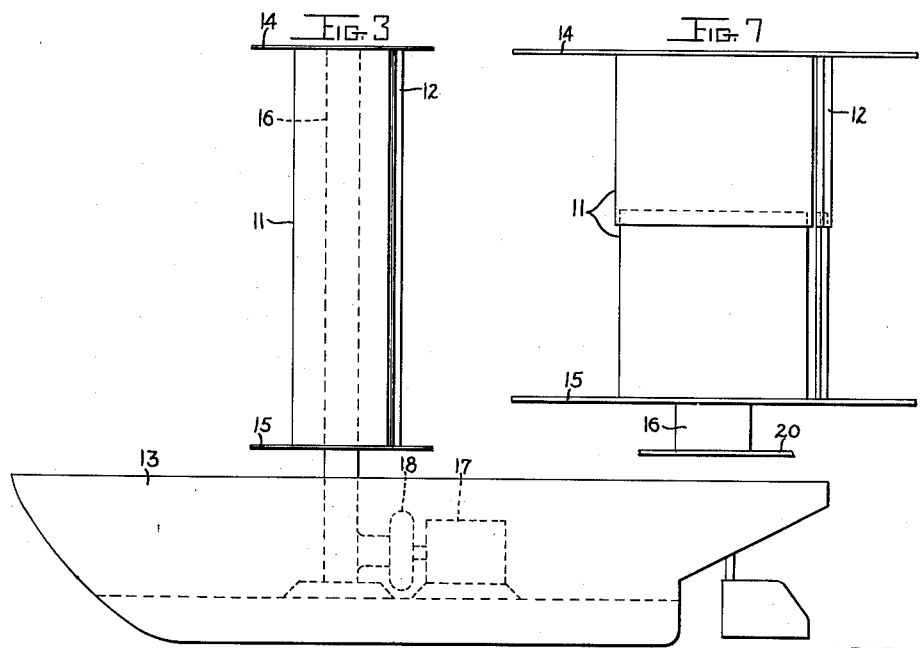
INVENTORS
THEODORE von KARMAN
FRANK L. WATTENDORF
BY *Louis A. Kline*
THEIR ATTORNEY July 19, 1955     T. VON KARMAN ET AL     2,713,392
WIND MOTOR
Filed May 11, 1950     2 Sheets-Sheet 2
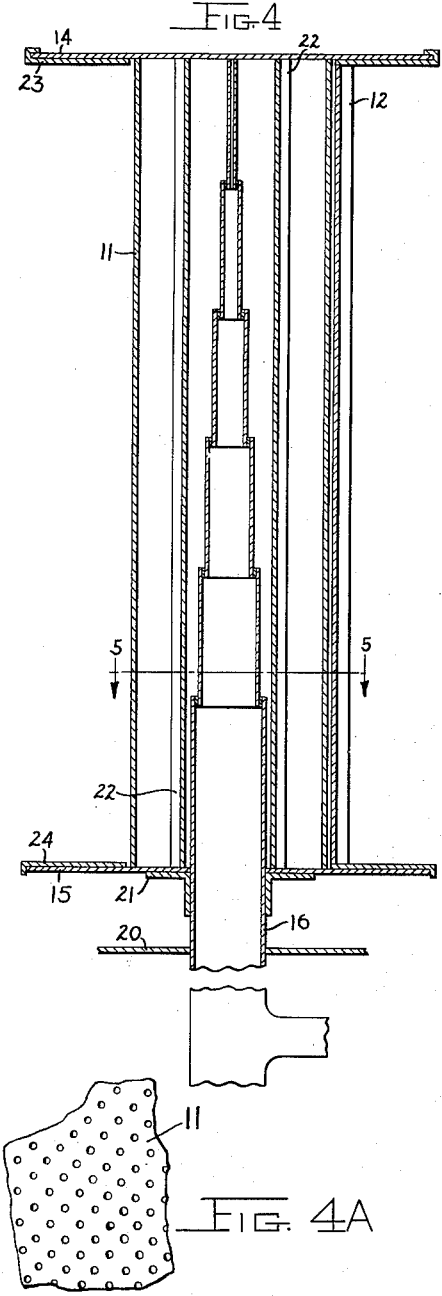
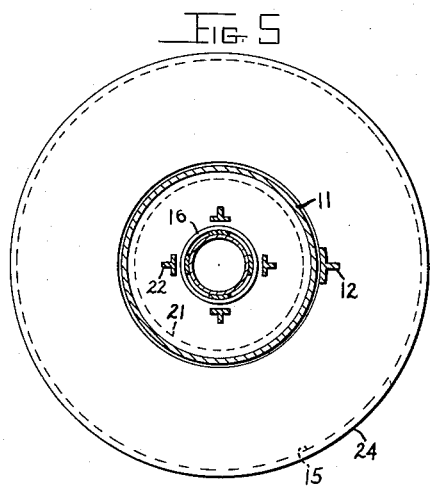
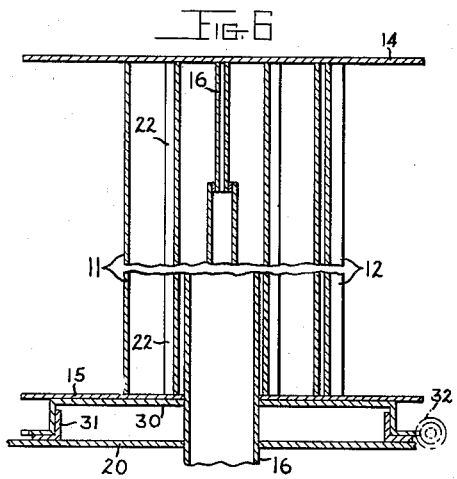
INVENTORS
THEODORE von KARMAN
FRANK L. WATTENDORF
BY *Louis A Kline*
THEIR ATTORNEY

United States Patent Office 2,713,392
Patented July 19, 1955

2,713,392

WIND MOTOR

Theodore Von Karman, Pasadena, Calif., and Frank L. Wattendorf, Dayton, Ohio

Application May 11, 1950, Serial No. 161,364

6 Claims. (Cl. 170—1.5)

This invention relates to a novel method and means for propelling an object by utilizing the forces of a natural wind to a greater degree than heretofore possible.

In order to explain the invention, it will be described as applied to the propulsion of a boat through water, but it will be obvious that it can be utilized equally well to propel other types of objects on land, ice, or the like.

In conventional types of sails used to propel boats, the propulsive forces derived from the wind are largely proportional to the area of the sails, to the square of the wind velocity, and to the coefficient of the normal force which is being derived from the angle at which the wind engages the sail. The maximum value of this coefficient in conventional types of sails is in the order of magnitude of unity referred to the so-called stagnation pressure of the wind; hence the only way to obtain more propulsive effect at the same wind velocity is to use larger sails.

One prior effort to reduce the size of the sails required resulted in the well-known Flettner-rotors, or reaction rotors, which were rotated to enable a propulsive force to be derived. The use of these rotors, while bringing about a reduction in the sail area required, introduced other problems which arose from the necessity for driving the rotor to produce the desired driving forces.

The instant invention also eliminates the use of conventional sails, and at the same time it avoids the drawbacks and problems of the reaction-rotor type. In general, the instant invention utilizes a hollow body of material having pores or openings therein which is mounted on the deck of the ship to be engaged by the wind and which has a suction applied to the interior of the body to set up a flow of air through the pores or openings in the walls of the body to remove the retarded layer of air adjacent the outer surface of the body to allow the wind, in passing the body, to form air streams which follow closely opposite outer surfaces of the body and are capable of producing forces normal to the surface of the body, with the resultant force being approximately perpendicular to the wind direction. A control member or deflector mounted closely adjacent the surface of the body and movable about the body relative thereto can deflect the air streams away from the surface of the body and thereby determine the extent of the opposite surfaces of the body over which the air streams flow to control the magnitude of the resultant force produced by the wind on the body.

For any given wind velocity, the method and means of the instant invention are capable of producing propulsive forces four or five times as great for the same projected area as a conventional sail. This means that a much smaller surface can be used for the same propulsive effect.

In the embodiment which will be described to explain the invention, the body will be in the form of a right circular cylinder, although the principle herein disclosed is also applicable when any cylindrical or conical body, including non-circular and inclined cones and cylinders and truncated cones, is used.

It is an object of the invention to provide a novel method of propelling an object by the forces of the wind, whereby a smaller "sail" area may be used to obtain the same propulsive effect as heretofore obtained.

A further object of the invention is to provide a novel method of propelling an object by subjecting a hollow porous or partially porous body to the action of a wind, and applying suction for the hollow body to withdraw, through the pores of the body, that layer of stagnant air which is next to the outer surface of the body, whereby to allow the wind to have a greater effect on the body to produce the increased propulsive effect.

A further object of the invention is to provide a novel means for utilizing the force of the wind to propel an object, which means requires less "sail" area than heretofore to produce the same propulsive effect and eliminates the usual long boom and other space requirements of conventional sail arrangements.

A further object of the invention is to provide a lightweight porous body, which is subjected to the action of wind, with suction means to remove retarded air at the surface of the body and enable the wind to have a greater effect thereon, and to provide a control means cooperable with the body to control the direction and magnitude of the forces produced by the action of the wind on the object.

A further object of the invention is to provide a light, compact, efficient means for transforming the force of the wind on the means into a propulsive force for driving an object.

With these and incidental objects in view, the invention includes certain novel features in the method and means for propelling an object and certain novel features of construction and combinations of parts, a preferred form or embodiment of which is hereinafter described with reference to the drawings which accompany and form a part of this specification.

Of said drawings,

Fig. 1 is a diagram showing the method of transforming the force of the wind into a force for propelling an object.

Fig. 2 is a plan view of a boat having a porous cylinder mounted thereon.

Fig. 3 is a side view of a boat having a porous cylinder mounted thereon.

Fig. 4 is a vertical section through the cylinder, taken along the line 4—4 in Fig. 2, showing the suction manifold and the control means.

Fig. 4A shows a fragment of the surface of the cylinder, showing in particular one form of pores or openings which may be provided therein.

Fig. 5 is a section through the cylinder, taken along the line 5—5 in Fig. 4, showing the suction manifold and the control means.

Fig. 6 is a vertical section similar to Fig. 4 but of a modified form of cylinder.

Fig. 7 shows a further modified form of cylinder.

Before describing the various means which are used in practicing the invention, the principles underlying the invention and the behavior of the air in the vicinity of the cylinder will be explained with reference to the diagrams of Fig. 1.

When a conventional cylindrical body 10 with a solid surface is placed in a wind stream, the air is unable to follow the surface much farther than the ninety-degree point on either side of the cylinder, as shown in diagram A of Fig. 1, because a small layer of retarded air forms adjacent the surface of the cylinder, and the slow-moving layer of air does not have sufficient kinetic energy to follow the highly-curved surface against an adverse pressure gradient. The flow therefore separates, as shown to the right in diagram A of Fig. 1, forming the well-known Karman vortex street and leaving a dead air space behind the cylinder. The resulting force $F_1$ due to the wind on the cylinder is entirely in the direction of the wind, and no other driving force is produced by the cylinder.

Diagram B of Fig. 1 shows the behavior of the air in the vicinity of the porous cylinder 11 of the instant invention after suction has been applied to the interior of the cylinder and when the control means 12 is positioned in a neutral position on the lee side of the cylinder and parallel to the direction of the wind. The suction applied to the interior of the cylinder is effective to draw off, through the pores or openings in the cylindrical surface, the layer of retarded air adjacent to the surface of the cylinder. This enables the flow of air to form two air streams which follow the opposite outer surfaces of the cylinder around to the control means, so that the Karman vortices and the wake size are reduced and no dead air space will be formed on the lee side of the cylinder. The high degree of curvature of the flow of the air streams around the cylinder results in large normal forces on each side of the cylinder, the resultant at each side being approximately perpendicular to the wind direction. With the flow following the opposite outer surfaces of the cylinder around to the rearmost position as in the diagram B, the air will traverse equal-length sections on either side of the cylinder, and, because of this symmetry, the resulting force components $F_2$ and $F_3$ produced by the cylinder are equal and opposite, and there will be no net propulsive force.

The instant invention provides further for the changing of the magnitude of these force components $F_2$ and $F_3$ by action of the control means 12. As shown in diagram C of Fig. 1, the control means or deflector 12 can be shifted from neutral or dead-center position on the leeward side of the cylinder, as shown in diagram B, to various positions about the cylinder to unbalance the length of the sections of the surface of the cylinder which the air streams will traverse on either side of the cylinder as shown in diagram C of Fig. 1. With suction applied to the cylinder, the air streams will traverse the upper and lower surfaces of the cylinder, as shown in diagram C, until they are deflected from the surface by the control means. This will produce a larger force in the direction of $F_2$ due to the larger surface traversed and will produce a smaller force in the direction of $F_3$ due to the smaller surface traversed, which results in a force, the difference between $F_2$ and $F_3$, in the direction of $F_2$, as shown in diagram C of Fig. 1. This resulting force will become of increasingly larger magnitude as the control means is displaced further clockwise away from neutral position in the diagrams of Fig. 1.

In this way, the novel method and means are capable of producing propulsive forces four or five times as great for the same projected area as a conventional sail. This means that a much smaller surface can be used for the same propulsive effect.

As shown in Figs. 2 and 3, the cylinder 11 of material having pores or openings therein is mounted on the boat 13 which is of any conventional hull design. The boat 13 is provided with the usual rudder to aid in its directional control. If the boat were of the type having a centerboard as well as a rudder, these would operate in the conventional manner to enable positive control of the direction of movement of the boat to be obtained. A fragment of the surface of the cylinder 11 is shown in Fig. 4A to show one form of pore arrangement therein. The pores are distributed over the surface of the cylinder and enable the retarded layer of air to be withdrawn through the cylinder. It is to be understood that the invention is not limited to the particular size or arrangement of pores shown in Fig. 4A, because the size and the arrangement of openings can be varied just so long as they allow the retarded air adjacent the outer surface of the cylinder to be withdrawn through the cylinder.

The cylinder 11 is provided with solid, impervious top and bottom plates 14 and 15 and has a suction manifold 16 extending upwardly through the center. A motor 17 drives a pump 18 for applying suction to the manifold.

Details of one form of cylinder and associated parts are shown in Figs. 4 and 5.

The manifold 16 extends through a deck 20 and through the bottom plate 15 of the cylinder, to which it is secured by any suitable means, such as a flanged ring 21. The manifold 16 is formed by a series of portions of reduced diameter connected by suitable spacers to provide openings along the manifold, which enable the suction to be distributed as desired throughout the length of the cylinder.

The top plate 14 and the bottom plate 15 of the cylinder can be connected by any suitable means, such as bracing rods 22, which are spaced about the manifold.

The control means or deflector 12 is mounted between suitable supporting flanged annular members 23 and 24, which cooperate with the plates 14 and 15 and support the means for movement circumferentially about the cylinder 11. After the control means 12 has been moved to the desired position about the cylinder, it can be locked in this position by any suitable retaining means.

It is believed that a cylinder having a diameter of but a few feet would produce adequate propulsion for crafts having a length of approximately twenty feet.

If desired, the control means 12 can be secured to the top and bottom plates 14 and 15; the cylinder 11 and the control means 12 can be shifted about the manifold 16 to position the control means properly in relation to the direction of the wind. As an example, the bottom plate 15 of the cylinder 11 can be mounted on a rotatable platform 30 (Fig. 6) mounted on a bearing 31 secured to the deck 20, the platform having gear teeth about its periphery which can be driven by a worm gear 32, which may be rotated by a motor to position the cylinder and the control means as desired.

Also, the cylinder 11 and the control means 12 can be made as shown in Fig. 7, and the manifold can be made telescopic, so that they can telescope as the top plate is lowered. This will enable the reduction of the size of the cylinder, if desired, and also will enable the cylinder to be lowered to enable the boat to pass under low bridges, etc.

While the cylinder has been described as being made of porous material, it is to be understood that the porosity need not extend over the entire surface of it but may be restricted to a portion of it, such as the lee portion, for instance, if desired.

The various means described above are capable of operating to propel the boat according to the method outlined earlier herein; the suction through the manifold 16 enabling the retarded air at the surface of the cylinder to be drawn through the pores of the cylinder to allow the wind to have a greater effect on the cylinder, so that the cylinder will be able to produce propulsive forces perpendicular to the wind direction, and the control means 12 controlling the balancing of these forces to control the net propulsive force which will result.

While the forms of the invention shown and described herein are admirably adapted to fulfill the objects primarily stated, it is to be understood that it is not intended to confine the invention to the forms or embodiments disclosed herein, for it is susceptible of embodiment in various other forms.

What is claimed is:

1. In an apparatus for utilizing a wind to propel an object, the combination of a porous hollow body stationarily mounted on the object and against which the wind may blow to produce an air stream over each of opposite outer surfaces of the body; means extending into the interior of the body for producing suction within the body, which suction is effective, through the pores in the opposite outer surfaces, to withdraw a layer of retarded air of the air streams through the pores to enable the air streams to follow the shape of the opposite outer surfaces of the body more closely and produce opposite propulsive forces perpendicular to the direction of the wind while the body remains in fixed position relative to the object; and deflector means cooperable with the outer surface of the body for deflecting the air streams away from the surface of the body and displaceable about the body relative to the wind to control the extent of surface which the air streams will pass over the opposite outer surfaces of the body to thereby control the magnitudes of the propulsive forces and hence the magnitude and direction of the resultant of the two propulsive forces.

2. An apparatus of the class described in claim 1 in which the means for producing the suction includes a manifold within the body and having a plurality of intake ports distributed along it to produce uniform suction over the opposite outer surfaces of the body.

3. An apparatus of the class described in claim 1 in which the deflector means is a fin located at the lee side of the body adjacent the outer surface of the body and perpendicular thereto to deflect the air streams away from the body.

4. In an apparatus for utilizing the wind to propel an object, the combination of a porous cylinder mounted vertically in fixed relation on the object, to be subjected to the wind; non-porous end plates for the cylinder; means extending to the interior of the cylinder to supply suction uniformly to the pores about the cylinder to draw a layer of retarded air adjacent the outer surface of the cylinder through the pores of the cylinder to reduce the space occupied by the Karman vortices and dead air on the lee side of the cylinder and thereby enable the air to pass over a larger portion of the surface of the cylinder, the airflow past the opposite outer surfaces of the cylinder, while the cylinder remains in fixed relation on the object, producing opposing propulsive forces away from the surfaces and perpendicular to the direction of the wind; and deflector means for deflecting the air away from the surface of the cylinder, said deflector means being mounted adjacent the outer surface of the cylinder and movable about the cylinder relative to the direction of the wind and the axis of the cylinder to control the extent to which the air can pass over the opposite surfaces of the cylinder and thereby control the direction and magnitude of the forces produced by the passage of the air past the cylinder.

5. In an apparatus for utilizing the wind to propel an object, the combination of a porous cylinder mounted vertically on the object, to be subject to the wind; said cylinder consisting of a plurality of sections of telescoping construction which can be telescoped to reduce the height of the cylinder; non-porous end plates for the cylinder; means extending to the interior of the cylinder to supply suction to the interior of the cylinder to draw a layer of retarded air adjacent the outer surface of the cylinder through the pores of the cylinder to reduce the space occupied by the Karman vortices and the dead air space on the lee side of the cylinder and thereby enable the air to pass over a larger portion of the surface of the cylinder, the airflow past the opposite outer surfaces of the cylinder producing propulsive forces away from the surfaces and perpendicular to the direction of the wind; and deflecting means for deflecting the air away from the surface of the cylinder, said deflecting means being mounted adjacent the outer surface of the cylinder and movable about the cylinder relative to the direction of the wind and the axis of the cylinder to control the extent to which the air can pass over the opposite surfaces of the cylinder and thereby control the direction and magnitude of the forces produced by the passage of the wind past the cylinder, and said control means also consisting of a plurality of sections of telescoping construction which can be telescoped to reduce the height of the control means when the height of the cylinder is reduced.

6. In an apparatus for utilizing the wind to propel an object, the combination of a porous cylinder to be subjected to the wind; means to support the cylinder vertically on the object for movement about its vertical axis to various set positions; non-porous end plates for the cylinder; means extending to the interior of the cylinder to supply suction uniformly to the pores about the cylinder to draw a layer of retarded air adjacent the outer surface of the cylinder through the pores of the cylinder to reduce the space occupied by the Karman vortices and dead air on the lee side of the cylinder and thereby enable the air to pass over a larger portion of the surface of the cylinder, the airflow past the opposite outer surfaces of the cylinder, while the cylinder remains set in any of its positions on the object, producing opposing propulsive forces away from the surfaces and perpendicular to the direction of the wind; and deflector means secured between the end plates and adjacent the surface of the cylinder for deflecting the air away from the surface of the cylinder, the deflector means and the cylinder being settable together to position the deflector means relative to the direction of the wind to control the extent to which the airflow can pass over opposite surfaces of the cylinder and thereby control the direction and magnitude of the forces produced by the passage of the air past the cylinder while the cylinder remains in its set position on the object.

References Cited in the file of this patent

UNITED STATES PATENTS

| 1,640,891 | Fritzel | Aug. 30, 1927 |
| 1,674,169 | Flettner | June 19, 1928 |
| 1,913,644 | Stalker | June 13, 1933 |

FOREIGN PATENTS

| 222,845 | Great Britain | May 7, 1925 |
| 597,674 | France | Nov. 26, 1925 |

OTHER REFERENCES

Serial No. 235,640, Van Den Bussche (A. P. C.), published May 25, 1943.